United States Patent
Gellert et al.

[11] Patent Number: 5,849,343
[45] Date of Patent: Dec. 15, 1998

[54] INJECTION MOLDING APPARATUS WITH A ONE-PIECE GATE INSERT LOCATING A CYLINDRICAL VALVE MEMBER

[75] Inventors: Jobst Ulrich Gellert, Georgetown; Denis L. Babin, Acton, both of Canada

[73] Assignee: Mold-Masters Limited, Georgetown, Canada

[21] Appl. No.: 854,243

[22] Filed: May 9, 1997

[30] Foreign Application Priority Data

Apr. 25, 1997 [CA] Canada ................................ 2203741

[51] Int. Cl.⁶ ..................................... B29C 45/23
[52] U.S. Cl. ................... 425/549; 264/328.9; 425/564; 425/566
[58] Field of Search .................. 425/562, 563, 425/564, 565, 566, 568, 549; 264/328.9

[56] References Cited

U.S. PATENT DOCUMENTS

| | | |
|---|---|---|
| 4,303,382 | 12/1981 | Gellert ................................ 425/566 |
| 4,875,848 | 10/1989 | Gellert . |
| 5,334,008 | 8/1994 | Gellert . |
| 5,505,613 | 4/1996 | Krummenacher ................ 425/562 |

OTHER PUBLICATIONS

D–M–E/Osco Valve Gate Runnerless Molding Systems—p. 43, OVG2 no date.

*Primary Examiner*—Tim Heitbrink
*Attorney, Agent, or Firm*—Dalesman & Company

[57] ABSTRACT

Valve gated injection molding apparatus having a valve member with a cylindrical front end portion. A one-piece insert mounted at the front end of a nozzle has both a gate and locating blades extending inwardly from an outer body into a central opening leading to the gate. The inner surfaces of the blades fit around the front end portion of the reciprocating valve pin to guide and very accurately locate it in alignment with the gate. Very accurately maintaining the front end portion of the reciprocating valve pin in alignment with the gate allows it to be cylindrical rather than tapered which produces a much cleaner gate mark.

5 Claims, 4 Drawing Sheets

INJECTION MOLDING APPARATUS WITH A ONE-PIECE GATE INSERT LOCATING A CYLINDRICAL VALVE MEMBER

BACKGROUND OF THE INVENTION

This invention relates generally to injection molding and more particularly to apparatus for valve gating having one or more one-piece gate and valve member locating inserts.

As seen in U.S. Pat. No. 4,875,848 to Gellert which issued Oct. 24, 1989, gate inserts which are screwed into the front end of a heated nozzle and have a front portion through which the gate extends fitting in an opening in the mold are well known. However, there is no provision for guiding or locating the front end of the reciprocating valve member in alignment with the gate and therefore a valve member having a tapered front end must be used to avoid damage due to misalignment. Using valve members having a cylindrical front end rather than a tapered front end has the advantage for some materials such as highly filled materials that it cuts or shears the melt rather than pinching or pressing it which produces a much cleaner gate mark. Using a nozzle insert or seal to guide or locate the front end of a valve member having a cylindrical front end as well as to locate the front end of the nozzle is shown in U.S. Pat. No. 5,334,008 to Gellert which issued Aug. 2, 1994. However, this has the disadvantage that the alignment of the front end of the valve member with the gate is not accurate enough due to tolerances of making the insert and the gate in two different pieces. An arrangement having a gate insert to provide the gate and locate the front end of the nozzle and a separate guide member to locate the front end of the valve member or valve pin guide is shown on page 43 of D-M-E brochure OVG2 entitled "D-M-E/OSCO Valve Gate Runnerless Molding Systems". However, this arrangement similarly has the disadvantage that alignment of the front end of the valve member with the gate is not accurate enough for a cylindrical valve member due to tolerances of making the guide member and the gate insert of two different pieces which must then be fitted together.

SUMMARY OF THE INVENTION

Accordingly, it is an object of the present invention to at least partially overcome the disadvantages of the prior art by providing an insert made of one-piece which forms the gate, locates the front end of the nozzle and locates and guides the front end of the reciprocating valve member.

To this end, in one of its aspects, the invention provides a valve gated injection molding apparatus to convey melt to a gate leading to a cavity in a mold comprising a heated nozzle having an outer surface, a rear end, a front end, a melt bore extending longitudinally therethrough from the rear end to the front end, and a seat extending around the melt bore at the front end, the nozzle seated in a well having an inner surface in the mold with an opening extending through the mold from the well to the cavity and an insulative air space extending between the outer surface of the nozzle and the inner surface of the well, an elongated valve member having a cylindrical front portion mounted to extend centrally in the melt bore through the nozzle, and valve member actuating means connected to the valve member whereby the valve member is reciprocated between a retracted open position wherein the melt flows through the gate from the melt bore into the cavity and a forward closed position wherein the cylindrical front portion of the valve member is seated in the gate, the improvement comprising a one-piece gate and locating insert having a plurality of spaced valve member locating blades extending inwardly from an outer body, the outer body having a rear portion extending from a rear end, a front portion extending to a front end, a central opening extending therethrough from the rear end and tapering inwardly to form the gate at the front end, the gate and locating insert being mounted to extend across the air space between the nozzle and the mold with the rear portion of the outer body being removably received in the seat in the front end of the nozzle and the front portion of the outer body fitting in the opening in the mold to prevent melt leakage therebetween and to locate the front end of the nozzle, the locating blades extending inwardly into the central opening each having an inner surface, the inner surfaces fitting around the cylindrical front portion of the valve member to locate and maintain the cylindrical front portion of the valve member in accurate alignment with the gate as the valve member reciprocates between the retracted open position and forward closed position.

Further objects and advantages of the invention will appear from the following description taken together with the accompanying drawings.

DETAILED DESCRIPTION OF THE INVENTION

Figure 1:
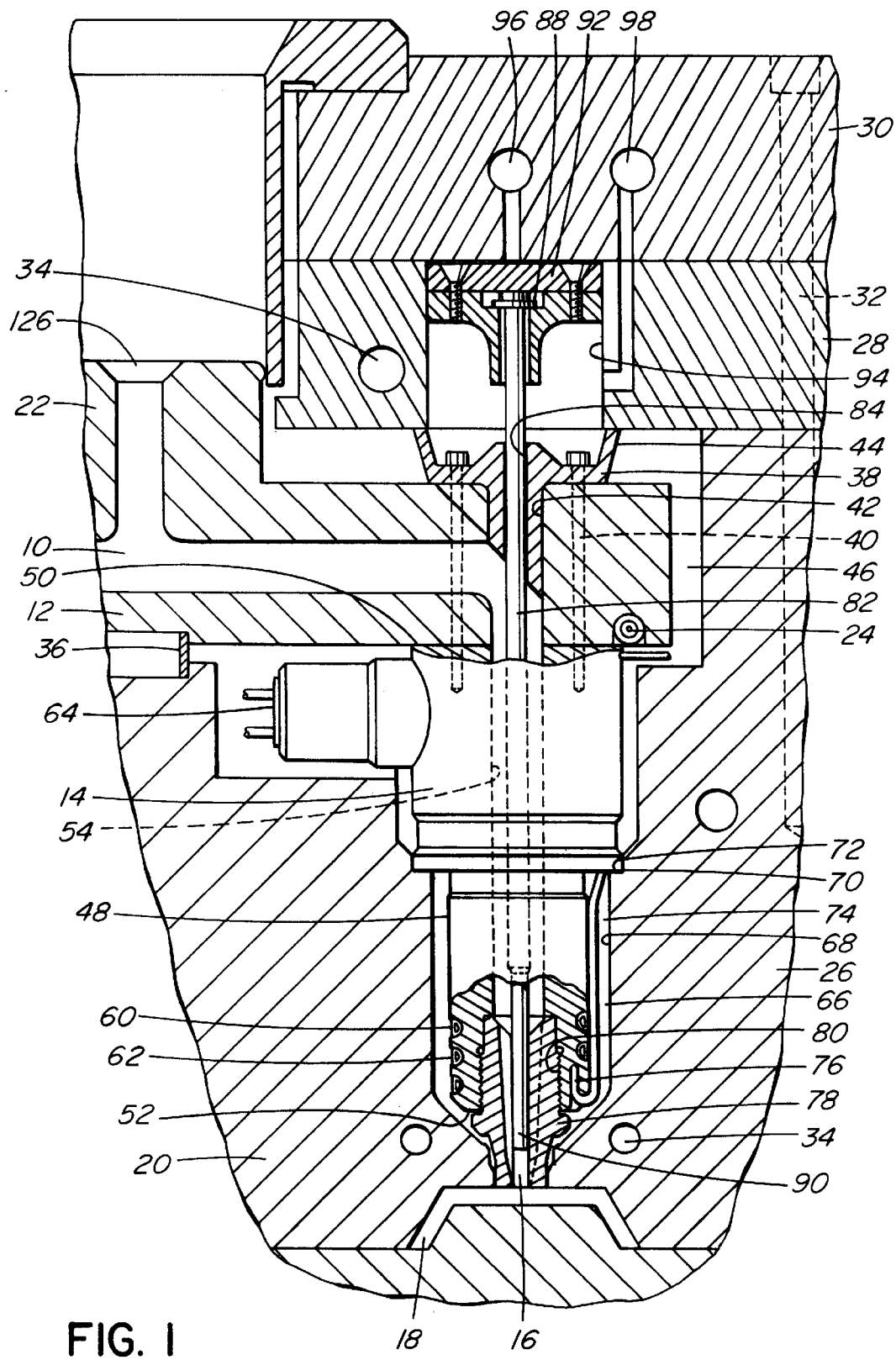
FIG. 1 is a sectional view of a portion of a multi-cavity valve gated injection molding system showing a one-piece gate and locating insert according to one embodiment of the invention.

Reference is first made to FIG. 1 which shows a portion a multi-cavity valve gated injection molding system or apparatus having a melt passage 10 extending through a steel melt distribution manifold 12 and several steel nozzles 14 to convey pressurized melt to respective gates 16 leading to different cavities 18 in a mold 20. The melt distribution manifold 12 has a cylindrical inlet portion 22 and is heated by an integral heating element 24. While the mold 20 usually has a greater number of plates depending upon the application, in this case only a cavity plate 26, a cylinder plate 28 and a back plate 30 which are secured together by screws 32 are shown for ease of illustration. The mold 20 is cooled by pumping cooling water through cooling conduits 34. The melt distribution manifold 12 is mounted between the cavity plate 26 and the cylinder plate 28 by a central locating ring 36 and sealing bushings 38. Each sealing bushing 38 is secured by screws 40 in a matching opening 42 in the manifold 12 and has a flanged portion 44 which bears against the cylinder plate 28. Thus, an insulative air space 46 is provided between the heated manifold 12 and the surrounding cooled mold 20.

Each nozzle 14 has an outer surface 48, a rear end 50, a front end 52 and a central melt bore 54 extending from the rear end 50 to the front end 52. The nozzle 14 is secured to the melt distribution manifold 12 by the screws 40 extending from the sealing bushing 38 into the rear end 50 of the manifold 12. The nozzle 14 is heated by an electrical heating element 60 which has a spiral portion 62 extending around the melt bore 54 and an external terminal 64 to which a power source is connected. The nozzle 14 is seated in a well 66 having an inner surface 68 in the cavity plate 26 with a cylindrical locating flange 70 received in a circular locating seat 72 in the well 66. This provides an insulative air space 74 between the outer surface 48 of the heated nozzle 14 and the inner surface 68 of the well 66 in the surrounding cooled cavity plate 26. A thermocouple element 76 extends through this air space 74 and into the front end 52 of the nozzle 14 to monitor the operating temperature. A one-piece gate and locating insert 78 according to one embodiment of the invention, as described in more detail below is screwed into a threaded seat 80 in the front end 52 of each nozzle 14.

An elongated valve member 82 extends through a bore 84 in the sealing bushing 38 centrally into the aligned melt bore 54 through each nozzle 14. The valve member 82 has an enlarged rear head 88 and a cylindrical front portion 90 which is received in the gate 16 in the forward closed position. The rear head 88 of the valve member 82 is connected to pneumatic actuating mechanism which includes a piston 92 seated in a cylinder 94 in the cylinder plate 28. Controlled air pressure is applied to opposite sides of each piston 92 through air ducts 96, 98 extending through the back plate 30 to reciprocate the valve members between the retracted open position shown in FIG. 1 and the forward closed position shown in FIG. 2. While a pneumatic actuating mechanism is shown for ease of illustration, of course hydraulic actuating mechanisms are used for many applications.

Figure 2:
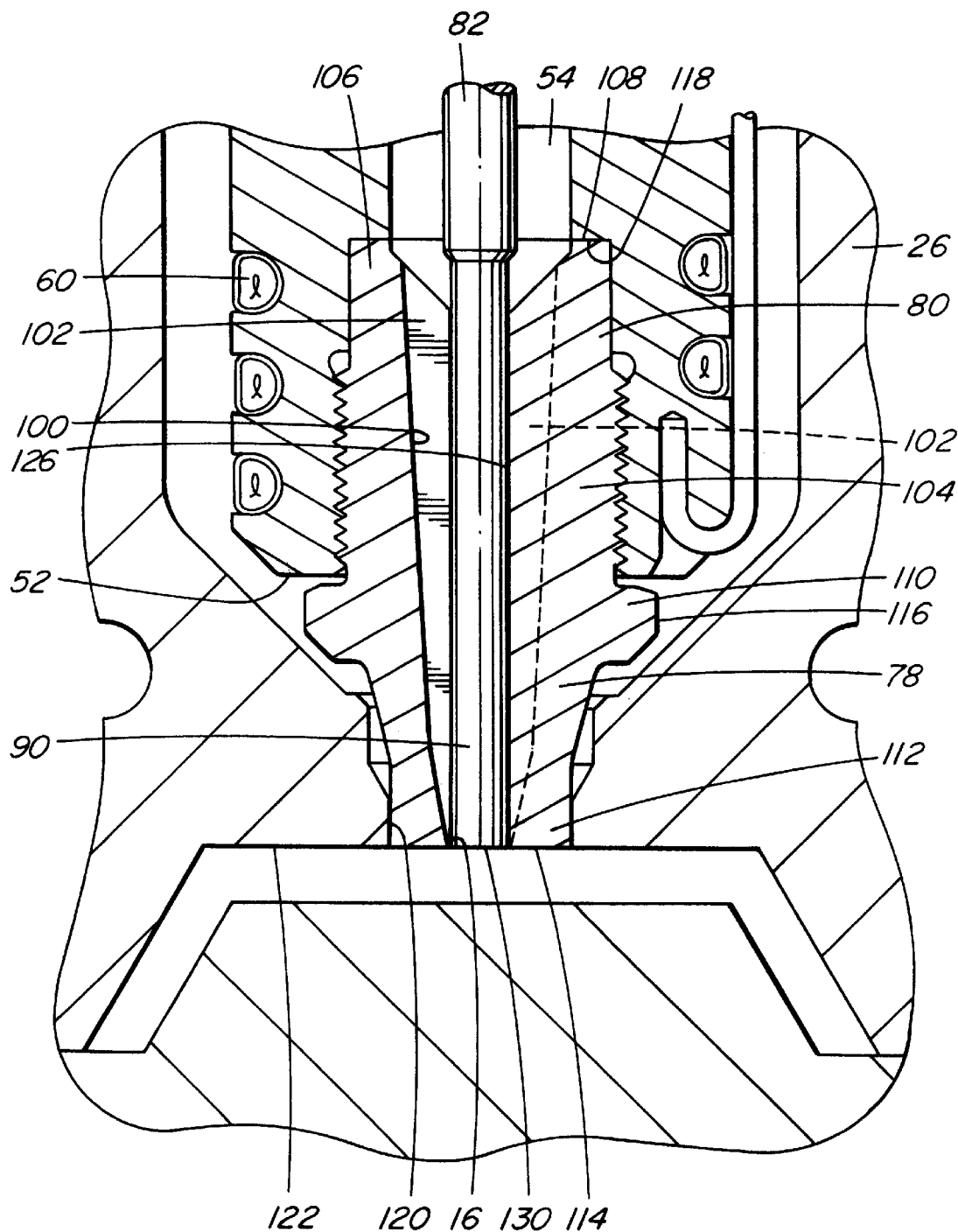
FIG. 2 is a larger sectional view of the one-piece gate and locating insert seen in FIG. 1.
Figure 3:
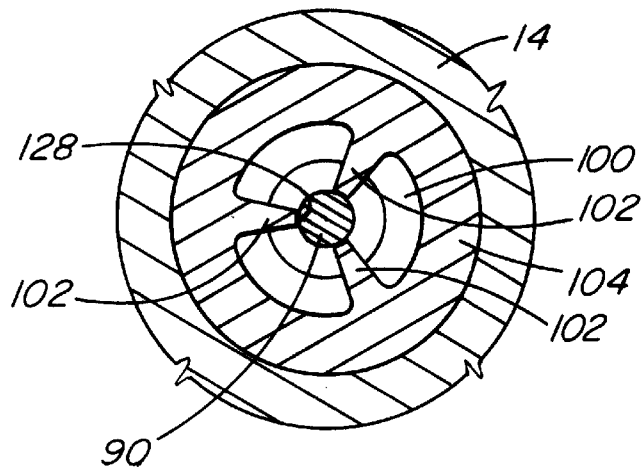
FIG. 3 is a cross-sectional view of the same gate and locating insert seen in FIG. 2.
Figure 4:
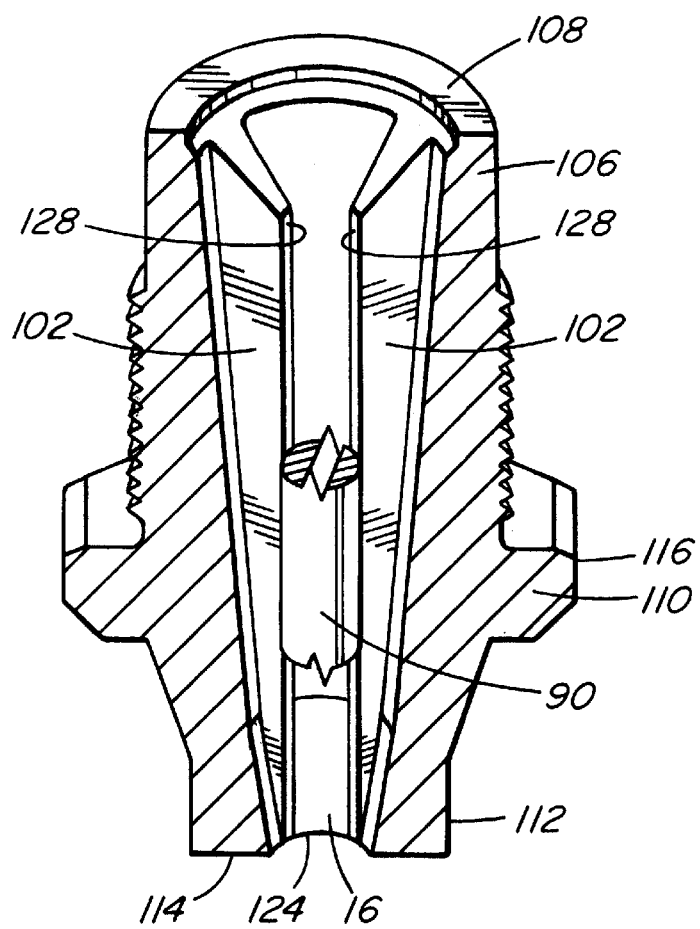
FIG. 4 is a cut-away isometric view of the same gate and locating insert seen in FIG. 3.

Reference is now made to FIGS. 2–4 in describing the one-piece gate and locating insert 78 according to this embodiment of the invention in detail. Each gate and locating insert 78 has a central opening 100 extending longitudinally therethrough with three locating blades 102 extending inwardly into the central opening 100 from an outer body 104. The outer body 104 has a cylindrical rear portion 106 extending from its rear end 108, a flanged intermediate portion 110, and a cylindrical front portion 112 extending to its front end 114. In this embodiment, the rear portion 106 is threaded to fit in the threaded seat 80 in the front end 52 of the nozzle 14. The flanged intermediate portion 110 has a hexagonal outer surface 116 to be engaged by a wrench (not shown) to tighten the gate and locating insert 78 into place with the rear end 108 of the outer body 104 abutting against the base 118 of the seat 80 in the front end 52 of the nozzle 14. As will be appreciated, this also allows the gate and locating insert 78 to be easily removed for cleaning or replacement. After a gate and locating insert 78 has been mounted on each nozzle 14 and the nozzles 14 are mounted on the melt distribution manifold 12, the manifold 12 is mounted in place with the front portion 112 of the outer body 104 of each gate and locating insert 78 received in an opening 120 in the mold 20. The cylindrical front portion 112 of the outer body 104 of each gate and locating insert 78 must fit closely enough in the opening 120 to prevent melt leakage between them and to accurately locate the gate and locating insert 78 and the front end 52 of the nozzle 14. The front end 114 of the gate and locating insert 78 is made to be flush with the wall 122 of the cavity 18 in the mold 20 when it is heated to the operating temperature so it forms part of the cavity wall.

As can be seen, the central opening 100 extending through the gate and locating insert 78 from its rear end 108 tapers inwardly to form the gate 16 adjacent its front end 114. The gate 16 provides a circular opening 124 at the front end of the gate and locating insert 78 inside of which the cylindrical front portion 90 of the valve member 82 fits. Each of the longitudinally extending locating blades 102 has a curved inner surface 128 in longitudinal alignment with the circular opening 124 formed by the gate 16. Thus, the three inner surfaces 128 of the locating blades 102 fit around the cylindrical front portion 90 of the valve member 82 to guide the cylindrical front portion 90 of the valve member 82 to locate and maintain it in accurate alignment with the gate 16 as it reciprocates between the retracted open position and the forward closed position.

The gate and locating insert 78 is made in one-piece by a metal injection molding process. In this embodiment, the gate and locating insert 78 is molded of a tungsten cobalt carbide alloy, but in other embodiments can be made of other steel having suitable corrosion and wear resistant characteristics. The metal injection molding process involves injecting a carbide alloy mixture into a cavity, ejecting the molded insert from the mold, and then debinding and sintering it to produce the one-piece insert 78 shown.

In use, the injection molding system is assembled as shown in FIG. 1. While only a single cavity 18 has been shown for ease of illustration, it will be appreciated that the melt distribution manifold 12 normally has many more melt passage branches extending to numerous cavities 18 depending on the application. Electrical power is applied to the heating element 24 in the manifold 12 and to the heating elements 60 in the nozzles 14 to heat them to a predetermined operating temperature. Hot pressurized melt is then injected from a molding machine (not shown) into the melt passage 10 through a central inlet 126 according to a predetermined cycle in a conventional manner. The melt passage branches outward in the manifold 12 to each nozzle 14 where it extends through the central bore 54 and then between the blades 102 in the central opening 100 in the gate and locating insert 78 and through the gate 16. In this embodiment, controlled pneumatic pressure is applied to the cylinders 94 through air ducts 96, 98 to control actuation of the pistons 92 and valve members 82 according to a predetermined cycle in a conventional manner. When the valve members 82 are in the retracted open position shown in FIG. 1, the pressurized melt flows through the melt passage 10, between the locating blades 102 in each gate and locating insert 78 and through the gates 16 until the cavities 18 are full. When the cavities 18 are full, injection pressure is held momentarily to pack. The pneumatic pressure is then reversed to reciprocate the valve members 82 to the forward closed position in which the cylindrical front portion 90 of each of the valve members 82 is seated in one of the gates 16 as shown in FIG. 2 with the flat front end 130 of the cylindrical front portion 90 of each valve member 82 aligned with the wall 122 of the cavity 18. Making the gate and locating insert 78 with both the gate 16 and the locating blades 102 of one-piece enables the reciprocating valve member 82 to be located accurately enough to allow the valve member 82 to have the cylindrical front portion 90 with the flat front end 130. This, in turn, cuts or shears the melt rather than pinching or pressing it as the gate 16 is closed and produces a much cleaner gate mark. After the gates 16 are closed, injection pressure is released and, after a short cooling period, the mold is opened for ejection. After ejection, the mold is closed, pneumatic pressure is applied to retract the valve members 82 to the open position and melt injection pressure is reapplied to refill the cavities 18. This cycle is repeated continuously every few seconds with a frequency depending upon the number and size of the cavities and the type of material being molded.

Figure 5:
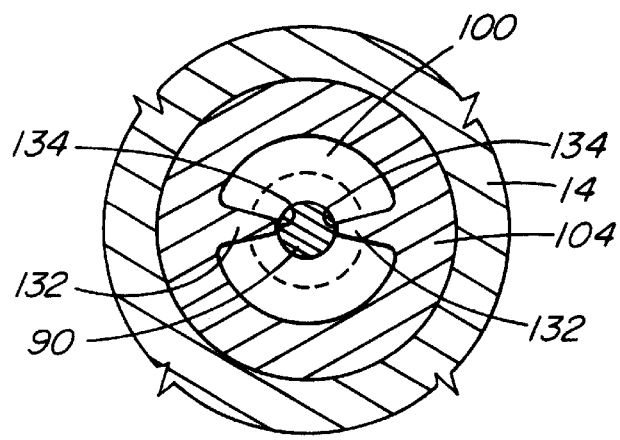
FIG. 5 is a cross-sectional view of a gate and locating insert according to another embodiment of the invention.
Figure 6:
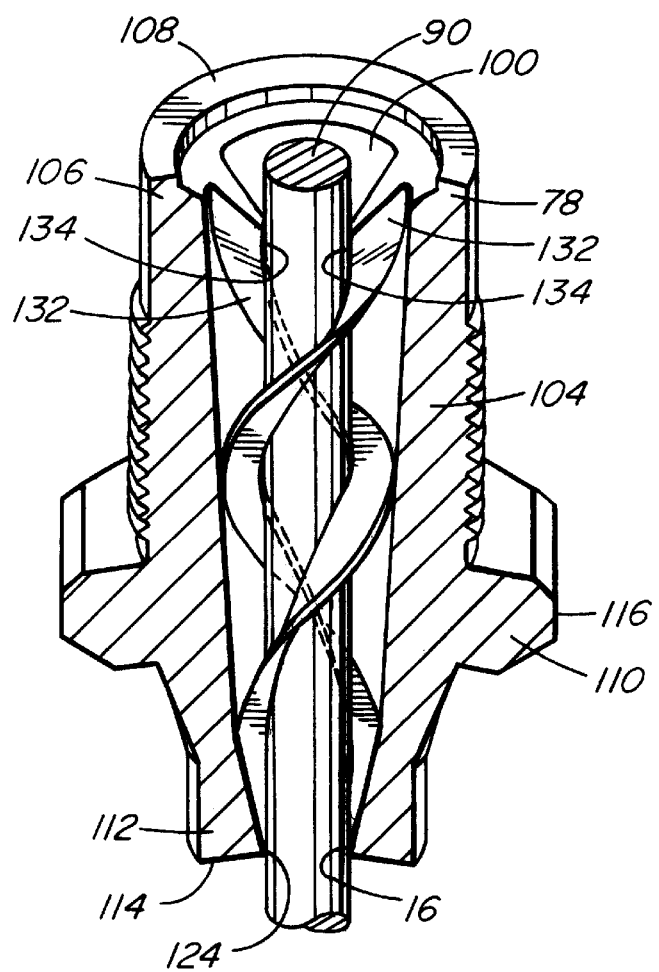
FIG. 6 is a cut-away isometric view of the gate and locating insert seen in FIG. 5.

Reference is now made to FIGS. 5 and 6 which show a one-piece gate and locating insert according to another embodiment of the invention. As many of the elements are the same as described above, elements common to both embodiments are described and illustrated using the same reference numerals. In this case, the gate and locating insert 78 has a pair of spiral blades 132 extending from the outer body 104 symmetrically inwardly into the central opening 100. The inner surfaces 134 of the spiral blades 132 are curved and encircle the cylindrical front portion 90 of the valve member 82 sufficiently to locate and maintain it in accurate alignment with the gate 16 as the valve member 82 reciprocates between the retracted open position and forward closed position. Accurately locating the cylindrical front portion 90 of the valve member 82 allows it to have the flat front end 130 without damaging the gate 16 which provides a cleaner gate mark as described above. The melt flows around the valve member 82 and between the spiral blades 132 through the central opening 100 in the gate and locating insert 78. In addition to accurately locating the valve member 82, the spiral blades 132 impart a swirling motion to the melt. This swirling motion is accelerated as the melt approaches the gate 16 and causes the melt to flow outwardly in the cavity 18 with a curving motion. This avoids flow lines in the molded product which can be produced with certain materials when using a gate and locating insert 78 having straight blades. It also produces a product which is stronger in the gate area.

While the description of the injection molding apparatus according to the invention has been given with respect to preferred embodiments, it will be evident that various other modifications are possible without departing from the scope of the invention as understood by those skilled in the art and as defined in the following claims.

The embodiments of the invention in which an exclusive property or privilege is claimed is defined as follows:

1. In a valve gated injection molding apparatus to convey melt to a gate leading to a cavity in a mold comprising a heated nozzle having an outer surface, a rear end, a front end, a melt bore extending longitudinally therethrough from the rear end to the front end, and a seat extending around the melt bore at the front end, the nozzle seated in a well having an inner surface in the mold with an opening extending through the mold from the well to the cavity and an insulative air space extending between the outer surface of the nozzle and the inner surface of the well, an elongated valve member having a cylindrical front portion mounted to extend centrally in the melt bore through the nozzle, and valve member actuating means connected to the valve member whereby the valve member is reciprocated between a retracted open position wherein the melt flows through the gate from the melt bore into the cavity and a forward closed position wherein the cylindrical front portion of the valve member is seated in the gate, the improvement comprising:

a one-piece gate and locating insert having a plurality of spaced valve member locating blades extending inwardly from an outer body, the outer body having a rear portion extending from a rear end, a front portion extending to a front end, a central opening extending therethrough from the rear end and tapering inwardly to form the gate at the front end, the gate and locating insert being mounted to extend across the air space between the nozzle and the mold with the rear portion of the outer body being removably received in the seat in the front end of the nozzle and the front portion of the outer body fitting in the opening in the mold to prevent melt leakage therebetween and to locate the front end of the nozzle, the locating blades extending inwardly into the central opening each having an inner surface, the inner surfaces fitting around the cylindrical front portion of the valve member to locate and maintain the cylindrical front portion of the valve member in accurate alignment with the gate as the valve member reciprocates between the retracted open position and forward closed position.

2. Valve gated injection molding apparatus as claimed in claim 1 wherein the gate comprises a circular opening at the front end of the gate and locating insert and the inner surfaces of the blades are curved and in longitudinal alignment with said circular opening.

3. Valve gated injection molding apparatus as claimed in claim 2 wherein the seat in the front end of the nozzle is threaded, the rear portion of the outer body of the gate and locating insert is threaded, and the gate and valve member locating insert has an intermediate portion extending in the air space between the nozzle and the mold, the intermediate portion being engageable by a suitable tool to removable screw the rear portion of the outer body of the gate and locating insert into the seat in the front end of the nozzle.

4. Valve gated injection molding apparatus as claimed in claim 3 wherein the gate and locating insert has three equally spaced straight blades extending inwardly into the central opening from the outer body.

5. Valve gated injection molding apparatus as claimed in claim 3 wherein the gate and locating insert has a pair of spiral blades extending symmetrically inwardly into the central opening from the outer body.

* * * * *